United States Patent
Wei et al.

(10) Patent No.: US 11,038,354 B2
(45) Date of Patent: Jun. 15, 2021

(54) PHOTOVOLTAIC CELL SYSTEM AND RAPID SHUTDOWN (RSD) CONTROL CIRCUIT AND METHOD

(71) Applicant: BravoTek Electronics Co., Ltd., Zhubei (TW)

(72) Inventors: Wei-Hsin Wei, Zhubei (TW); Teng-Hung Chang, Zhubei (TW)

(73) Assignee: BravoTek Electronics Co., Ltd.

( * ) Notice: Subject to any disclaimer, the term of this patent is extended or adjusted under 35 U.S.C. 154(b) by 122 days.

(21) Appl. No.: 16/385,095

(22) Filed: Apr. 16, 2019

(65) Prior Publication Data

US 2020/0335976 A1   Oct. 22, 2020

(51) Int. Cl.
| | |
|---|---|
| *H02J 3/38* | (2006.01) |
| *H02S 40/32* | (2014.01) |
| *H02H 7/20* | (2006.01) |
| *H02J 13/00* | (2006.01) |

(52) U.S. Cl.
CPC .............. *H02J 3/383* (2013.01); *H02H 7/20* (2013.01); *H02S 40/32* (2014.12); *H02J 13/0013* (2013.01)

(58) Field of Classification Search
CPC ........ H02J 3/383; H02J 13/0013; H02J 9/062; H02J 2009/068; H02S 40/32; H02S 40/30; H02H 7/20; Y02E 10/56
USPC ...................................................... 307/78–86
See application file for complete search history.

(56) References Cited

U.S. PATENT DOCUMENTS

| | | | |
|---|---|---|---|
| 9,369,126 B1 | 6/2016 | Dunton et al. | |
| 9,496,710 B2 | 11/2016 | Narla et al. | |
| 2016/0329715 A1* | 11/2016 | Orr | G01R 31/54 |
| 2017/0288408 A1 | 10/2017 | Kim et al. | |
| 2020/0303949 A1* | 9/2020 | Pauletti | H02S 40/32 |

FOREIGN PATENT DOCUMENTS

| | | |
|---|---|---|
| CN | 106130059 A | 11/2016 |
| CN | 106602504 A | 4/2017 |

OTHER PUBLICATIONS

Communication corresponding to Chinese Application No. 201910303789.0 and issued by the China National Intellectual Property Administration dated Mar. 29, 2021, 8 pages.

* cited by examiner

*Primary Examiner* — Toan T Vu
(74) *Attorney, Agent, or Firm* — Innovation Counsel LLP

(57) ABSTRACT

A rapid shutdown (RSD) control circuit includes: a RSD controller having first and second terminals coupled to first and second terminals of a photovoltaic cell module, respectively; a transistor having a gate coupled to the RSD controller, a source coupled to the second terminal of the photovoltaic cell module, and a drain; and a diode coupled between the drain of the transistor and the first terminal of the photovoltaic cell module. In a normal state, controlled by the RSD controller, the transistor is controlled to have a first impedance state and the photovoltaic cell module outputs an output power to an inverter. In a shutdown state, controlled by the RSD controller, the transistor and the diode are controlled as a variable impedance, and thus a voltage between the first terminal and the second terminal of the photovoltaic cell module is regulated to a desired voltage.

16 Claims, 3 Drawing Sheets

PHOTOVOLTAIC CELL SYSTEM AND RAPID SHUTDOWN (RSD) CONTROL CIRCUIT AND METHOD

TECHNICAL FIELD

The disclosure relates in general to a photovoltaic cell system and rapid shutdown (RSD) control circuit and method.

BACKGROUND

Photovoltaic cells are one of clean energy implementations and thus draw more and more attention. With improvements on technology, photovoltaic cell systems have high efficiency and low cost. However, safety standards on the photovoltaic cell system are becoming increasingly vital, so as to reduce electric shock and energy hazards for maintenance personnel and emergency personnel. In 2017, one of the safety standards, National Electrical Code (NEC) 690.12, has been evolved further to require the photovoltaic cell system to reduce the output voltage under 30V and the output power under 240 volt-ampere in 10 seconds.

Thus, the application provides a photovoltaic cell system and rapid shutdown (RSD) control circuit and method to meet the safety standard on the photovoltaic cell system.

SUMMARY

According to one embodiment, a rapid shutdown control circuit for a photovoltaic cell system is provided. The rapid shutdown control circuit is coupled to a photovoltaic cell module and the photovoltaic cell module is coupled to an inverter. The rapid shutdown control circuit includes: a rapid shutdown controller coupled to the photovoltaic cell module, the rapid shutdown controller having a first terminal and a second terminal, the first terminal of the rapid shutdown controller is coupled to a first terminal of the photovoltaic cell module and the second terminal of the rapid shutdown controller is coupled to a second terminal of the photovoltaic cell module; a transistor having a gate coupled to the rapid shutdown controller, a source coupled to the second terminal of the photovoltaic cell module, and a drain; and a diode having a first terminal coupled to the drain of the transistor and a second terminal coupled to the first terminal of the photovoltaic cell module. In a normal state, controlled by the rapid shutdown controller, the transistor is controlled to have a first impedance state and the photovoltaic cell module outputs an output power to the inverter. In a shutdown state, controlled by the rapid shutdown controller, the transistor and the diode are controlled as a variable impedance, and thus a voltage between the first terminal and the second terminal of the photovoltaic cell module is regulated to a desired voltage.

According to another embodiment, a photovoltaic cell system is provided. The photovoltaic cell system includes: a plurality of photovoltaic cell modules; a plurality of rapid shutdown control circuits coupled to the photovoltaic cell modules; a string controller coupled to the rapid shutdown control circuits for sending a first control signal to the rapid shutdown control circuits; and an inverter coupled to the photovoltaic cell modules for converting an DC voltage from the photovoltaic cell modules to an AC voltage. In a normal state, controlled by the rapid shutdown control circuits, respective voltages between a plurality of first terminals and a plurality of second terminals of the photovoltaic cell modules output in series to enable the inverter for outputting the AC voltage from the inverter. In a shutdown state, controlled by the rapid shutdown control circuits, the respective voltages between the plurality of first terminals and the plurality of second terminals of the photovoltaic cell modules are regulated to a desired voltage so that a total series voltage level of the photovoltaic cell modules is low enough to disable the inverter.

According to an alternative embodiment, a rapid shutdown control method for a photovoltaic cell system is provided. The photovoltaic cell system includes a plurality of photovoltaic cell modules, a plurality of rapid shutdown control circuits, a string controller and an inverter. The method includes: in a normal state, in response to a first control signal from the string controller, controlling, by the rapid shutdown control circuits, respective voltages between a plurality of first terminals and a plurality of second terminals of the photovoltaic cell modules output in series to enable the inverter for outputting an AC voltage from the inverter; and in a shutdown state, in response to the first control signal from the string controller, controlling, by the rapid shutdown control circuits, the respective voltages between the plurality of first terminals and the plurality of second terminals of the photovoltaic cell modules to be regulated to a desired voltage so that a total series voltage level of the photovoltaic cell modules is low enough to disable the inverter.

Figure 1:
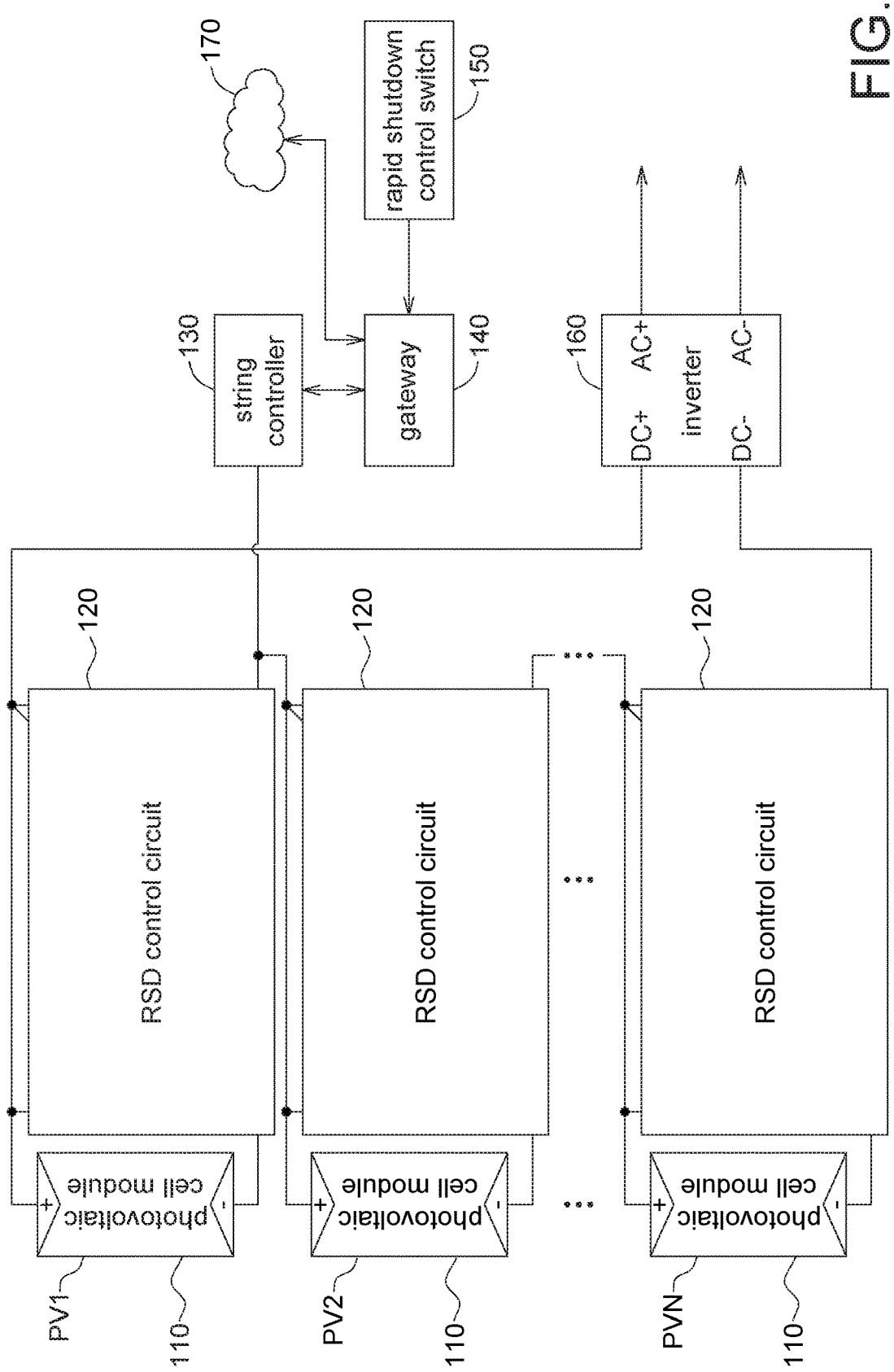
FIG. 1 shows a functional block diagram for a photovoltaic cell system according to an exemplary embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a functional block diagram for a photovoltaic cell system according to an exemplary embodiment of the application. As shown in FIG. 1, the photovoltaic cell system 100 according to an exemplary embodiment of the application includes a plurality of photovoltaic cell modules 110, a plurality of rapid shutdown (RSD) control circuits 120, a string controller 130, a gateway 140, a rapid shutdown control switch 150 and an inverter 160.

The photovoltaic cell system 100 includes at least one photovoltaic cell module 110. In FIG. 1, the photovoltaic cell modules 110 are marked as PV1, PV2, . . . , and PVN. Each of the photovoltaic cell modules 110 is series connected and also referred as a string of photovoltaic cell modules 110. As known, the photovoltaic cell module 110 is operated to convert solar energy into DC voltage. The total output voltage of the photovoltaic cell modules 110 is input to the inverter 160.

The rapid shutdown control circuits 120 are one-to-one corresponding to the photovoltaic cell modules 110. The rapid shutdown control circuits 120 are coupled to the photovoltaic cell modules 110. In response to a control signal from the string controller 130 or from the rapid shutdown control switch 150, the rapid shutdown control circuits 120 may rapidly shut down the photovoltaic cell modules 110. Details are described later.

The string controller 130 is coupled to the rapid shutdown control circuits 120. Further, the string controller 130 is coupled between one of the rapid shutdown control circuits 120 and another of the rapid shutdown control circuits 120. In response to the control signal from the rapid shutdown control switch 150, the string controller 130 outputs a control signal to the rapid shutdown control circuits 120 for rapidly shutting down the photovoltaic cell modules 110.

The gateway 140 is coupled between the string controller 130 and the rapid shutdown control switch 150. The gateway 140 is also coupled to a cloud server 170. The cloud server 170 can execute a remote shutdown operation on the photovoltaic cell modules 110 via the gateway 140 and the string controller 130. Also, parameters of the photovoltaic cell modules 110 collected by the string controller 130 may be sent to the cloud server 170 via the gateway 140. Further, if the photovoltaic cell system 100 includes a plurality of string controllers 130 (each of the string controllers 130 for controlling a respective string of the photovoltaic cell modules 110), the plurality of string controllers 130 share the gateway 140. That is, the plurality of string controllers 130 send respective parameters of the plurality of strings of the photovoltaic cell modules 110 via the gateway 140 to the cloud server 170. Also, the cloud server 170 can send a remote shutdown signal to the plurality of strings of the photovoltaic cell modules 110 via the gateway 140.

The inverter 160 is coupled to the photovoltaic cell modules 110 for converting a DC voltage from the photovoltaic cell modules 110 into an AC voltage (for example but not limited by 110V AC voltage). That is, two input terminals (DC+ and DC−) of the inverter 160 are respectively coupled to a positive terminal (PV+) of the photovoltaic cell module 110 (PV1) and a negative terminal (PV−) of the photovoltaic cell module 110 (PVN); and output terminals (AC+ and AC−) of the inverter 160 output AC voltage.

In the exemplary embodiment of the application, rapid shutdown and restart of the photovoltaic cell modules 110 of the photovoltaic cell system 100 are implemented.

The rapid shutdown control switch 150 may be electrical, mechanical or graphic button or interface. When the rapid shutdown control switch 150 is at OFF state, the output power from the photovoltaic cell modules 110 will be interrupted. Or, the rapid shutdown control switch 150 may be user-operated and is controlled by the administrator or other personal to rapidly shutdown output from the photovoltaic cell modules 110 for safety. Further, the rapid shutdown control switch 150 may be software and/or hardware which may detect the status and interrupt output from the photovoltaic cell modules 110 even without user intervention. Further, the rapid shutdown control switch 150 may be operated to control respective output from one or more photovoltaic cell modules 110.

In an exemplary embodiment of the application, the control signal from the string controller 130 to the plurality of RSD control circuits 120 may include message protocol to control all the photovoltaic cell modules 110. The message protocol is a multi-bit signal. The message protocol includes for example but not limited by FSK (Frequency-shift keying) and the details are omitted here. Further, message protocol may independently control shutdown and activation of the photovoltaic cell modules 110.

Figure 2:
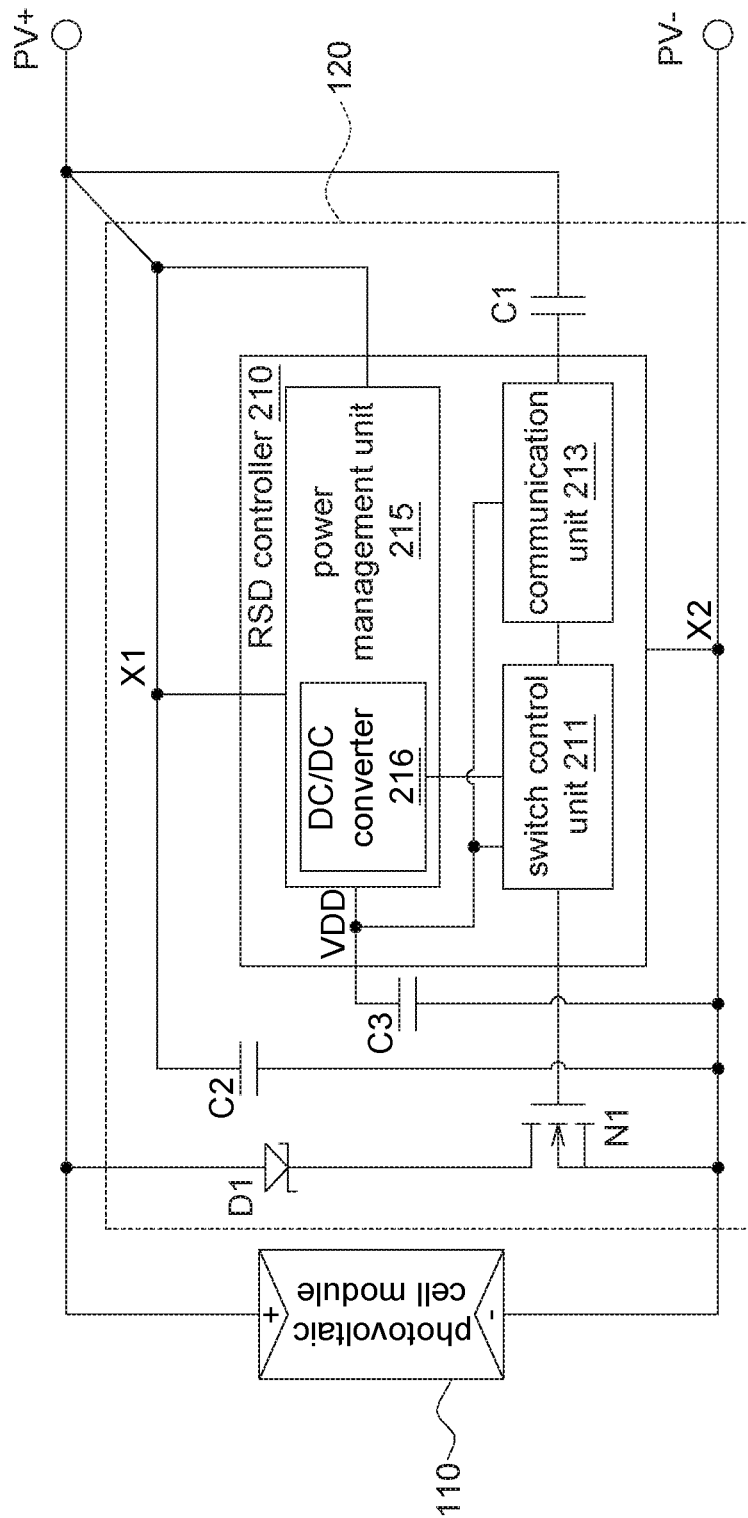
FIG. 2 shows a functional block diagram for a rapid shutdown control circuit of a photovoltaic cell system according to an exemplary embodiment of the application.

FIG. 2 shows a functional block diagram for a rapid shutdown control circuit of a photovoltaic cell system according to an exemplary embodiment of the application. As shown in FIG. 2, the rapid shutdown control circuit 120 includes a RSD controller 210, a diode D1, a transistor N1, an AC coupling capacitor C1 and decoupling capacitors C2 and C3.

The RSD controller 210 controls the gate voltage of the transistor N1 in response to the control signal from the string controller 130. In other words, the RSD controller 210 controls an impedance of the transistor N1 in response to the control signal from the string controller 130. The RSD controller 210 includes a first terminal coupled to the first terminal (PV+) of the photovoltaic cell module 110 and a second terminal coupled to the second terminal (PV−) of the photovoltaic cell module 110.

The RSD controller 210 includes a switch control unit 211, a communication unit 213 and a power management unit 215. The RSD controller 210 is also parallel-connected to the photovoltaic cell module 110.

The power management unit 215 includes a DC/DC converter 216. The DC/DC converter 216 is used to convert a voltage of the first terminal (PV+) of the photovoltaic cell module 110 to a constant power supply voltage VDD for the RSD controller 210 to be operated in both the normal state and the shutdown state. That is, the DC/DC converter 216 provides the constant power supply voltage VDD to the switch control unit 211, the communication unit 213 and the power management unit 215.

The communication unit 213 receives the control signal from the string controller 130 via the AC coupling capacitor C1. The communication unit 213 demodulates the control signal from the string controller 130 to send a demodulation result to the control logic 211 and thus the switch control unit 211 controls the impedance of the transistor N1. The communication unit 213 modulates parameters (for example, the voltage, the current and the temperature) of the photovoltaic cell module 110 into an AC signal and sends back to the string controller 130 via the AC coupling capacitor C1 for further management/control.

The switch control unit 211 controls the gate voltage of the transistor N1 to modulate the impedance of the transistor N1 in response to the control signal from the communication unit 213 or from the power management unit 215. At normal state, the impedance of the transistor N1 is controlled to be very high and thus the transistor N1 consumes substantially no power provided from the positive terminal (PV+) of the photovoltaic cell module 110. At shutdown state, the impedance of the transistor N1 is controlled to regulate the voltage at the positive terminal (PV+) of the photovoltaic cell module 110 to a desired low value to meet safety requirement. Furthermore, the DC/DC converter 216 of the power management unit 215 can convert the voltage at the positive terminal (PV+) of the photovoltaic cell module 110 to the constant power supply voltage VDD for the RSD controller 210. The power management unit 215 is also used for detecting the voltage at the positive terminal (PV+) of the photovoltaic cell module 110 and sending the detecting result to the switch control unit 211 to control the gate voltage of the transistor N1.

The transistor N1 includes a gate coupled to the switch control unit 211 of the RSD controller 210; a source coupled to the second terminal (PV−) of the photovoltaic cell module 110; and a drain coupled to the diode D1.

The diode D1 includes a first terminal (for example a cathode) coupled to the drain of the transistor N1 and a second terminal (for example an anode) coupled to the first terminal (PV+) of the photovoltaic cell module 110.

The AC coupling capacitor C1 is coupled between the RSD controller 210 and the first terminal (PV+) of the photovoltaic cell module 110.

The decoupling capacitor C2 is coupled between a first terminal X1 of the RSD controller 210 and a second terminal X2 of the RSD controller 210.

The decoupling capacitor C3 is coupled between the output voltage VDD from the DC/DC converter 216 and the second terminal X2 of the RSD controller 210. The voltage output VDD from the DC/DC converter 216 is decoupled by the decoupling capacitor C3 to supply for the RSD controller 210 in both the normal state and the shutdown state.

Operations of the RSD controller 210 are explained. In normal state, based on the control signal (i.e. the message protocol from the string controller 130), the switch control unit 211 controls the transistor N1 to have a high impedance and thus the transistor N1 consumes substantially no power provided from the positive terminal (PV+) of the photovoltaic cell module 110. The output power from the photovoltaic cell module 110 is mostly allowed to send to the inverter 160. A total output voltage from the string of the photovoltaic cell modules 110 (i.e. PV1-PVN) are high enough to enable the inverter 160 for outputting the AC voltage from the inverter 160.

In shutdown state, based on the control signal (i.e. the message protocol from the string controller 130), the switch control unit 211 controls the transistor N1 (and also the diode D1 is connected) and thus the transistor N1 and the diode D1 form a variable impedance (or said a current sinker) to regulate the voltage between the first terminal (PV+) and the second terminal (PV−) of the photovoltaic cell module 110 to a desired low value. Thus, the output power from the photovoltaic cell module 110 is low enough to avoid safety issue. In shutdown state, the total output voltage from the string of the photovoltaic cell modules 110 (i.e. PV1-PVN) is low enough to disable the inverter 160 and to prevent safety issue, such as electric shock and energy hazards for maintenance personnel and emergency personnel.

By FIG. 1 and FIG. 2, the control signal from the string controller 130 is forwarded to all the RSD control circuit 120 via AC coupling.

In an exemplary embodiment of the application, in order to re-start the photovoltaic cell modules 110, in response to the operations of the rapid shutdown control switch 150 (for example switched to the ON state), the string controller 130 sends the control signal (AC signal) to the RSD control circuits 120; and the RSD control circuits 120 control the transistors N1 to a high impedance state. By so, the output voltages of the photovoltaic cell modules 110 are allowed to send to the inverter 160 for re-starting the photovoltaic cell modules 110.

Figure 3:
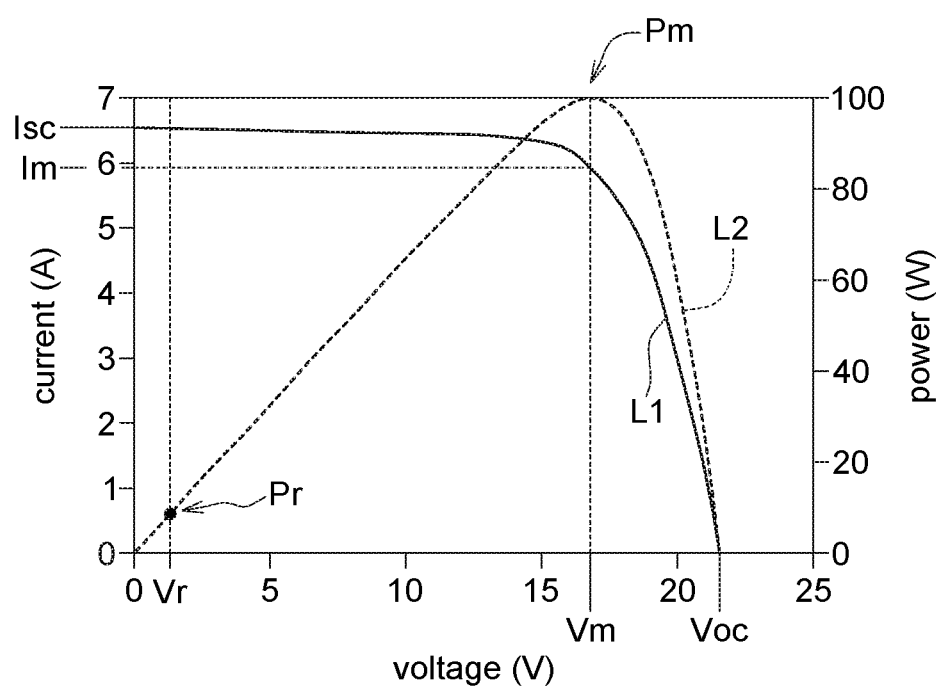
FIG. 3 shows a characteristic curve of a photovoltaic cell module according to an exemplary embodiment of the application.

FIG. 3 shows a characteristic curve of a photovoltaic cell module according to an exemplary embodiment of the application. As shown in FIG. 3, the curve L1 refers to a voltage-current curve of the photovoltaic cell module, wherein Voc refers to an open circuit voltage (about 21V or 22V in FIG. 3); and Isc refers to a short-circuit current (about 6.5 A in FIG. 3). The curve L2 refers to a power-voltage curve of the photovoltaic cell module (power=V*I), wherein Pm refers to a maximum power of the photovoltaic cell module and Vm, Im refer to the voltage and the current at which the photovoltaic cell module outputs the maximum power. By adjusting loads (not shown), the photovoltaic cell module outputs the maximum power Pm.

As shown in FIG. 3, in an exemplary embodiment of the application, the output voltages of the photovoltaic cell modules are regulated to the desired low voltage Vr (or to a very low voltage close to zero) in shutdown state (Pr=Vr*Isc, Pr referring to the output power of the photovoltaic cell module). That is, in an exemplary embodiment of the application, the photovoltaic cell system is able to reduce the total output voltage under 30V (because the output voltage of the photovoltaic cell module is regulated to a desired low voltage, for example, less than 0.8V) and to reduce the total output power under 240 volt-ampere in 10 seconds. The output power of the photovoltaic cell module is rapidly reduced. In an exemplary embodiment of the application, the photovoltaic cell system may meet the safety standard.

Further, in an exemplary embodiment of the application, parallel shutdown of the photovoltaic cell module 110 is achieved. In here, the "parallel shutdown" refers to that the regulation element (formed by the transistor N1 and the diode D1) is parallel to the photovoltaic cell module 110; and in parallel shutdown, the regulation element (formed by the transistor N1 and the diode D1) which is parallel to the photovoltaic cell module 110 is regulated by sinking the most photocurrent of the photovoltaic cell module 110, resulting in the output power of the photovoltaic cell module 110 to a sufficient low value to meet safety standard.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A rapid shutdown control circuit for a photovoltaic cell system, the rapid shutdown control circuit being coupled to a photovoltaic cell module and the photovoltaic cell module further coupled to an inverter, the rapid shutdown control circuit including:
   a rapid shutdown controller coupled to the photovoltaic cell module, the rapid shutdown controller having a first terminal and a second terminal, the first terminal of the rapid shutdown controller is coupled to a first terminal of the photovoltaic cell module and the second terminal of the rapid shutdown controller is coupled to a second terminal of the photovoltaic cell module;
   a transistor having a gate coupled to the rapid shutdown controller, a source coupled to the second terminal of the photovoltaic cell module, and a drain; and
   a diode having a first terminal coupled to the drain of the transistor and a second terminal coupled to the first terminal of the photovoltaic cell module;
   wherein in a normal state, controlled by the rapid shutdown controller, the transistor is controlled to have a first impedance state and the photovoltaic cell module outputs an output power to the inverter; and
   in a shutdown state, controlled by the rapid shutdown controller, the transistor and the diode are controlled as a variable impedance, and thus a voltage between the first terminal and the second terminal of the photovoltaic cell module is regulated to a desired voltage.

2. The rapid shutdown control circuit according to claim 1, wherein the rapid shutdown controller is parallel connected to the photovoltaic cell module;
and the transistor and the diode are parallel connected to the photovoltaic cell module.

3. The rapid shutdown control circuit according to claim 2, further including: a first capacitor coupled between the rapid shutdown controller and the first terminal of the photovoltaic cell module.

4. The rapid shutdown control circuit according to claim 3, further including: a second capacitor coupled between the first and second terminals of the rapid shutdown controller.

5. The rapid shutdown control circuit according to claim 4, further including: a third capacitor coupled between a constant supply voltage from the rapid shutdown controller and the second terminal of the rapid shutdown controller.

6. The rapid shutdown control circuit according to claim 5, wherein the rapid shutdown controller includes:
a switch control unit for controlling a gate voltage of the transistor to regulate an impedance of the transistor;
a communication unit for receiving a control signal from a string controller via the first capacitor, the control signal from the string controller including a message protocol which includes a multibit signal, the communication unit further demodulating the control signal to send a demodulation result to the switch control unit; and
a power management unit for sensing a voltage of the first terminal of the photovoltaic cell module via the switch control unit to control the gate voltage of the transistor to regulate the voltage between the first and second terminals of the photovoltaic cell module, the power management unit including a DC/DC converter for converting the voltage of the first terminal of the photovoltaic cell module to the constant supply voltage for supplying power to the switch control unit and the communication unit.

7. The rapid shutdown control circuit according to claim 6, wherein the communication unit further modulates a parameter of the photovoltaic cell module into an AC signal for sending back via the first capacitor.

8. A photovoltaic cell system including:
a plurality of photovoltaic cell modules;
a plurality of rapid shutdown control circuits coupled to the photovoltaic cell modules;
wherein each of the plurality of rapid shutdown control circuits including: a rapid shutdown controller coupled to the photovoltaic cell module, the rapid shutdown controller having a first terminal and a second terminal, the first terminal of the rapid shutdown controller is coupled to a first terminal of the photovoltaic cell module and the second terminal of the rapid shutdown controller is coupled to a second terminal of the photovoltaic cell module, a transistor having a gate coupled to the rapid shutdown controller, a source coupled to the second terminal of the photovoltaic cell module, and a drain, and a diode having a first terminal coupled to the drain of the transistor and a second terminal coupled to the first terminal of the photovoltaic cell module, a string controller coupled to the rapid shutdown control circuits for sending a first control signal to the rapid shutdown control circuits; and an inverter coupled to the photovoltaic cell modules for converting a DC voltage from the photovoltaic cell modules;
wherein in a normal state, controlled by the rapid shutdown control circuits, respective voltages between a plurality of first terminals and a plurality of second terminals of the photovoltaic cell modules output in series to enable the inverter for outputting an AC voltage from the inverter; and in a shutdown state, controlled by the rapid shutdown control circuits, the respective voltages between the plurality of first terminals and the plurality of second terminals of the photovoltaic cell modules are regulated to a desired voltage so that a total series voltage level of the photovoltaic cell modules is low enough to disable the inverter.

9. The photovoltaic cell system according to claim 8, further including a rapid shutdown control switch;
wherein the string controller is coupled between one among the rapid shutdown control circuits and another among the rapid shutdown control circuits; and
in response to a second control signal from the rapid shutdown control switch, the string controller outputs the first control signal to the rapid shutdown control circuits to shut down the photovoltaic cell modules.

10. The photovoltaic cell system according to claim 9, wherein the rapid shutdown control switch is user-operated.

11. The photovoltaic cell system according to claim 10, wherein the first control signal from the string controller to the rapid shutdown control circuits includes a message protocol which includes a multi-bit signal.

12. The photovoltaic cell system according to claim 8, wherein the rapid shutdown controller is parallel connected to the photovoltaic cell module; and the transistor and the diode are parallel connected to the photovoltaic cell module.

13. The photovoltaic cell system according to claim 8, wherein the rapid shutdown controller further includes:
a first capacitor coupled between the rapid shutdown controller and the first terminal of the photovoltaic cell module;
a second capacitor coupled between the first and second terminals of the rapid shutdown controller; and
a third capacitor coupled between a constant supply voltage from the rapid shutdown controller and the second terminal of the rapid shutdown controller.

14. The photovoltaic cell system according to claim 13, wherein the rapid shutdown controller includes:
a switch control unit for controlling a gate voltage of the transistor to regulate an impedance of the transistor;
a communication unit for receiving the first control signal from the string controller via the first capacitor, the communication unit further demodulating the first control signal to send a demodulation result to the switch control unit; and
a power management unit for sensing a voltage of the first terminal of the photovoltaic cell module via the switch control unit to control the gate voltage of the transistor to regulate the voltage between the first and second terminals of the photovoltaic cell module, the power management unit including a DC/DC converter for converting the voltage of the first terminal of the photovoltaic cell module to the constant supply voltage for supplying power to the switch control unit and the communication unit.

15. The photovoltaic cell system according to claim 14, wherein the communication unit further modulates a parameter of the photovoltaic cell module into an AC signal for sending back to the string controller via the first capacitor.

16. A rapid shutdown control method for a photovoltaic cell system including a plurality of photovoltaic cell modules, a plurality of rapid shutdown control circuits coupled to the photovoltaic cell modules, a string controller and an inverter; wherein each of a plurality of the rapid shutdown control circuits comprises:

a rapid shutdown controller coupled to the photovoltaic cell module, the rapid shutdown controller having a first terminal and a second terminal, the first terminal of the rapid shutdown controller is coupled to a first terminal of the photovoltaic cell module and the second terminal of the rapid shutdown controller is coupled to a second terminal of the photovoltaic cell module;

a transistor having a gate coupled to the rapid shutdown controller, a source coupled to the second terminal of the photovoltaic cell module, and a drain; and a diode having a first terminal coupled to the drain of the transistor and a second terminal coupled to the first terminal of the photovoltaic cell module, the method including:

in a normal state, in response to a first control signal from the string controller, controlling, by the rapid shutdown control circuits, respective voltages between a plurality of first terminals and a plurality of second terminals of the photovoltaic cell modules output in series to enable the inverter for outputting an AC voltage from the inverter; and in a shutdown state, in response to the first control signal from the string controller, controlling, by the rapid shutdown control circuits, the respective voltages between the plurality of first terminals and the plurality of second terminals of the photovoltaic cell modules to be regulated to a desired voltage so that a total series voltage level of the photovoltaic cell modules is low enough to disable the inverter.

* * * * *